United States Patent [19]

Williams

[11] 4,317,408

[45] Mar. 2, 1982

[54] WEAR RESISTANT PUMP PACKING CUP
[75] Inventor: Michael R. Williams, Jonesboro, Ark.
[73] Assignee: FMC Corporation, Chicago, Ill.
[21] Appl. No.: 142,505
[22] Filed: Apr. 21, 1980

Related U.S. Application Data

[63] Continuation of Ser. No. 918,006, Jun. 22, 1978, abandoned.
[51] Int. Cl.³ ............................................... F16J 9/08
[52] U.S. Cl. ........................................ 92/241; 92/240; 92/249; 277/212 C; 277/233
[58] Field of Search ................ 92/240, 245, 241, 254, 92/242, 192, 249; 277/188 R, 188 A, 233, 212 C, 212 F, 205

[56]  References Cited

U.S. PATENT DOCUMENTS

| 1,765,097 | 6/1930 | Robertson . | |
| 1,825,185 | 9/1931 | Greenidge . | |
| 1,945,524 | 2/1934 | Foehr | 92/240 X |
| 2,081,040 | 5/1937 | King | 92/241 |
| 2,360,735 | 10/1944 | Smith | 277/233 X |
| 2,388,520 | 11/1945 | Bowie | 277/212 C |
| 2,676,075 | 4/1954 | Stone . | |
| 2,852,323 | 9/1958 | Bowerman | 92/242 |
| 3,006,536 | 10/1961 | Chausson | 92/240 X |
| 3,103,787 | 9/1963 | Reynolds | 92/245 X |
| 3,177,781 | 4/1965 | MacFarlane | 92/245 X |

FOREIGN PATENT DOCUMENTS 263764  7/1927  United Kingdom .................. 92/192

Primary Examiner—Irwin C. Cohen
Attorney, Agent, or Firm—Richard B. Megley; Louis J. Pizzanelli

[57]  ABSTRACT

A packing is provided with a multilayered construction and a cup-like shape. The packing is configured to be carried in a packing holder for reciprocating motion within a pump cylinder. Some of the layers in the packing terminate on the convex face of the cup shape at radially spaced locations therearound. Thus, a peripheral portion of a number of the layers behind the cup lip are exposed to be engaged by the cylinder wall at a continuous contact area therearound. The hardness of the layer located outermost on the convex face is the greatest, and the hardness of each succeeding adjacent layer is lesser than the one immediately preceeding when progressing toward the cup lip along the convex face. Extrusion of the packing between the packing holder and the cylinder wall and subsequent severe localized wear is resisted by the greater hardness layers. A more uniform distribution of pressure across the area of contact between the packing and the cylinder wall is provided by the reduced tendency of the packing to extrude and the decreasing hardness sequence of adjacent layers.

6 Claims, 6 Drawing Figures

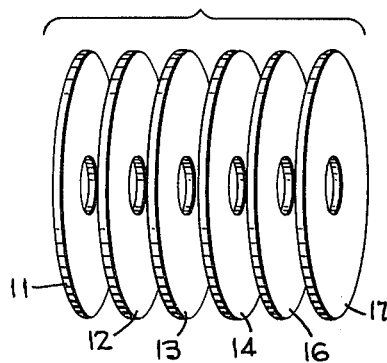
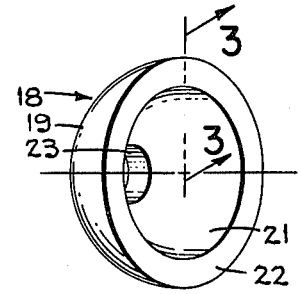
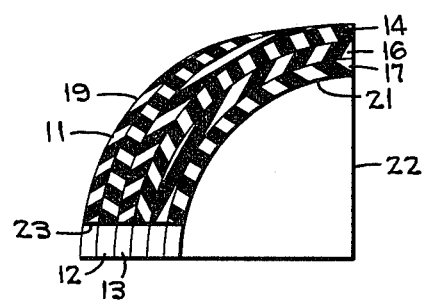
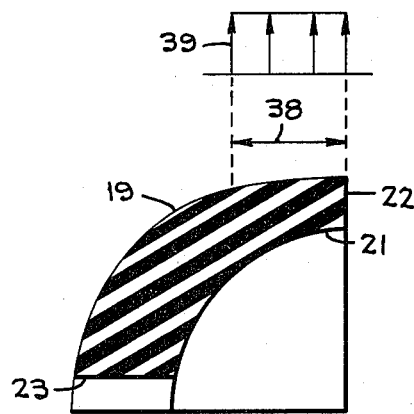
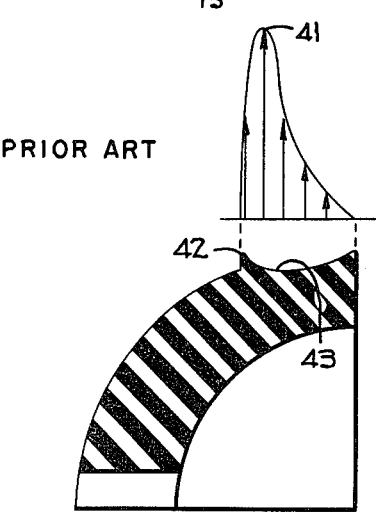
PRIOR ART
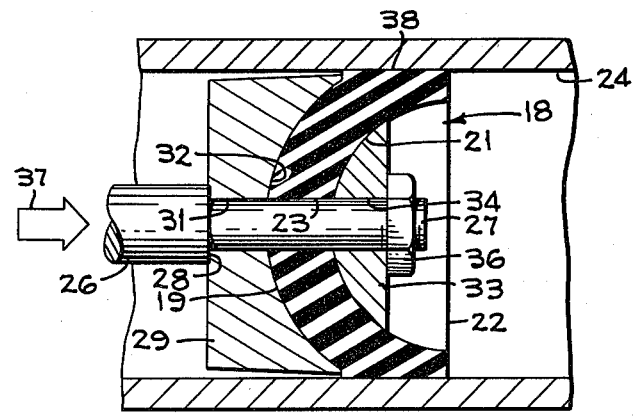

WEAR RESISTANT PUMP PACKING CUP

This is a continuation of application Ser. No. 918,006 filed June 22, 1978, now abandoned.

BACKGROUND OF THE INVENTION

1. Field of the Invention

This invention relates to reciprocating pump packings and more particularly to such packings particularly adapted for use under conditions causing severe wear problems.

2. Description of the Prior Art

Pump packings made from a stack of fabric reinforced uncured rubber disc preforms have long been in use in reciprocating pumps such as those manufactured by FMC Corporation, Agricultural Machinery Division, Jonesboro, Ark. The packing is generally in the shape of a spherical cup having a forward annular lip which is compressed somewhat when fitted within the walls of a pump cylinder. The cup is formed under heat and pressure with the rearmost disc in the stack becoming the convex surface of the packing and terminating at the forward annular lip. Thus, the rearmost disc in the stack is the only disc which contacts the cylinder wall when the packing is in place in the pump. When such a packing is supported in a holding member and driven with the lip leading in the cylinder during the pressure stroke, it is common for the packing proximate to the cylinder wall to "balloon" within the necessary clearance space provided between the cylinder wall and the holding member. The "ballooning" causes the packing material to extrude toward the rear between the holding member and the cylinder wall. As a consequence, a high pressure spike appears between the packing and the cylinder wall at that point near the rear portion, or the heel, of the contact area. The packing material is worn away in the heel area due to the high pressure, the "ballooning" tendency is increased due to the weakened packing in the heel area and additional packing material migrates to the heel of the contact area, thus accelerating wear. Severe localized wear patterns are observed at this portion of the contact area due to the high contact pressure. There is generally little or no contact pressure in the area at the forward lip of the cup shaped packing due to initial deformation of the packing material which causes the lip to separate from the cylinder wall when fitted within the pump cylinder. The high localized contact pressure and accelerated wear in the heel area soon requires packing replacement due to the excessive localized wear.

It is apparent that a packing cup with structural characteristics which will reduce the extrusion tendency and provide a more uniform pressure across the contact area between the packing and the cylinder wall would be desirable from the standpoint of decreasing the rate of packing wear and thereby increasing the packing life.

SUMMARY OF THE INVENTION

A cup shaped packing is adapted to be carried by a packing holder in the cylinder of a reciprocating pump. The packing is of a layered construction of bonded discs of elastomeric material. Ones of the bonded discs terminate on the convex side of the cup so that the terminal portions of some of the discs are in contact with the cylinder wall. A disc with a high hardness elastomeric material is located outermost on the convex side of the cup shaped packing. The high hardness tends to resist "ballooning" and extrusion of the packing between the packing holder and the cylinder wall. The discs successively assume lesser hardness characteristics in the sequence of bonded layers proceeding along the convex side of the cup away from the high hardness disc. Due to the reduced extrusion tendency resulting from the high hardness characteristic in the outermost disc and the more resilient characteristics of the inner discs, a more uniform contact pressure is obtained across the area of contact between the packing and the cylinder wall.

BRIEF DESCRIPTION OF THE DRAWINGS

FIG. 1 is an exploded view of the uncured fabric reinforced disc preforms used in constructing the packing cup of the present invention.

FIG. 2 is an isometric view of the molded and cured packing cup of the present invention. FIG. 3 is an enlarged fragmentary section of the packing cup of the present invention taken along the line 3—of FIG. 2.

FIG. 4 is a diagrammatic fragmentary section (with the layered construction not being shown) and pressure diagram of the packing cup of the present invention for illustrating the contact pressure distribution along the cylinder wall.

FIG. 5 is a fragmentary section and pressure diagram of a prior art packing cup illustrating the resulting contact pressure distribution along the cylinder wall.

FIG. 6 is a central section of an installed reciprocating pump piston assembly including a diagrammatic illustration of the packing of the present invention (with the layered construction not being shown).

DESCRIPTION OF THE PREFERRED EMBODIMENTS

In FIG. 1 a series of preformed fabric reinforced discs of an uncured elastomeric material, such as rubber, is shown. Each of the discs has a centrally located through hole. An end disc 11 is fabricated of a material having a composition which provide a very hard elastomer when cured. Adjacent to the disc 11 in the stack of preformed discs of FIG. 1 is a disc 12 which is formed of an elastomeric material which assumes a medium hard state when cured. A disc 13 is adjacent to disc 12 which is fabricated of a material which provides a medium soft elastomer upon being cured. Discs 14, 16 and 17, in one embodiment of this invention, are fabricated of an elastomeric material which assumes a relatively soft state when cured.

The manner in which the stack of rubberlike discs of FIG. 1 is molded and cured to provide the packing cup configuration 18 of FIG. 2 is well known and involves the use of elevated temperatures and pressures in a forming die. Such processes are not considered to be part of this invention. The cured packing cup 18 has a convex rear face 19 and a concave front face 21. The rear and front faces 19 and 21 are joined by a front lip 22 surrounding the open end of the packing cup 18.

FIG. 3 shows that the forming process to which reference was made hereinbefore provides a smooth surface at the convex rear face 19 on the cured packing cup 18. It should be noted in FIG. 3 that the outer diameter of the fabric reinforced discs 11, 12, 13 and 14 in the layered sequence from the rear face 19 to the lip 22 terminate on the convex rear surface 19 at positions progressively closer to the cup lip 22. Consequently, portions of resilient material of different hardness are exposed on the convex rear surface 19 in the cylinder contact area immediately behind the front lip 22. The holes in the preforms of FIG. 1 are seen to provide a hole 23 extending through the base of the cup shaped packing 18.

Turning now to FIG. 6 of the drawings, a cylinder having walls 24 is shown surrounding the packing cup 18. A piston rod 26 has an end extension 27 thereon which is formed to fit through the hole 23 in the packing cup. A shoulder 28 is provided at the junction of the main body of the piston rod 26 and the end extension 27. A packing holder 29 has a centrally located hole 31 therethrough which is received upon the end extension 27 so that the packing holder 29 may be seated against the shoulder 28. A concave surface 32 is formed on the packing holder 29 serving as a seat for the convex rear surface 19 of the packing cup. A packing retainer ring 33 is provided which engages the concave front surface 21 on the packing cup. The retainer ring has a hole 34 therethrough which surrounds the end extension 27. A nut 36 threadably engages the end extension 27 to axially secure the packing retainer ring 33 against the molded packing cup 18 thereby securing the packing cup 18 within the packing holder 29. The piston rod 26 is driven within the cylinder in a direction indicated by the arrow 37 during a pressure, or pumping, stroke.

The combination fragmentary sectional view and pressure diagram of FIG. 4 shows the relatively uniform distribution of contact pressure 39 being exerted by the packing cup 18 of the present invention against the cylinder wall 24 across a contact area 38 therebetween. The tendency seen in previous packings for the packing cup material to extrude through the gap between the packing holder 29 and the cylinder wall 24 is resisted by the very hard elastomeric material of the outermost disc 11. The layered construction of bonded discs of elastomeric material is such that the outer edge of the medium hard elastomeric material disc 12 lies within the annular contact area 18 of the packing. The medium soft disc 13 and the soft disc 14 are also arranged so that their outer edges lie within the contact area 38 between the packing cup 18 and the cylinder wall 24. With the resistance to "ballooning" and extrusion in the heel portion of the contact area 38, the usual pressure spike at the heel region is seen (from FIG. 4) to be prevented. The relatively soft characteristics of the discs 13 and 14 provide an improved sliding seal adjacent the front lip 22 and, consequently, a substantially uniform distribution of contact pressure along the contact area 38 between the cup and the cylinder wall.

In contrast, the packing cup to which reference is made in the description of the prior art in this specification is shown in FIG. 5. A typical wear pattern after use in a pump is shown. The wear pattern confirms the indicated contact pressure profile across the annular contact area between the packing and the cylinder during use. A high pressure spike 41 is shown near the heel of the contact area. A raised portion 42 is seen at the heel of the contact area and a heavily worn contact portion 43 on the packing is shown. The raised portion 42 at the heel of the contact area is caused by the extrusion mentioned hereinbefore between the packing holder and the cylinder during the pressure stroke. The displaced material toward the heel of the contact area accentuates the high pressure spike 41 causing the severe wear evidenced by the wear seen along the contact portion 43. The old type packing of FIG. 5 soon loses the necessary sliding seal in the contact area due to the wear characteristic shown, and pump efficiency deteriorates.

Another embodiment of the present invention will now be described with reference to FIG. 3. In this embodiment both the inner and outer layers 17 and 11, respectively, are fabricated of very hard elastomeric material, the layers 16 and 12 are fabricated of a medium hard elastomeric material, and the inner layers 13 and 14 are fabricated of a soft elastomeric material. The relatively hard elastomeric material in layers 11 and 17 does not touch the cylinder wall 24. Their purpose is to support the relatively soft inner layers which provide a sliding seal when they contact the cylinder wall. The same pressure profile and wear pattern as seen in FIG. 4 results, with added resistance to packing material "ballooning" and extrusion.

By way of example, the first described embodiment of the present invention may include discs exhibiting hardness values on the Shore A scale in the range of 50 to 100. The following Table I sets forth suitable Shore A scale hardness characteristics for the succession of discs in the sequence of bonded layers.

TABLE I

| | |
|---|---|
| Disc 11 | 100 |
| Disc 12 | 90 |
| Disc 13 | 70 |
| Disc 14 | 60 |
| Disc 16 | 60 |
| Disc 17 | 60 |

A representative set of hardness values for the second disclosed embodiment of the present invention is shown in Table II below.

TABLE II

| | |
|---|---|
| Disc 11 | 100 |
| Disc 12 | 80 |
| Disc 13 | 60 |
| Disc 14 | 60 |
| Disc 16 | 80 |
| Disc 17 | 100 |

Although the best modes contemplated for carrying out the present invention have been herein shown and described, it will be apparent that modification and variation may be made without departing from what is regarded to be the subject matter of the invention.

What is claimed is:

1. In combination with a pump of the type wherein a packing holder is disposed for reciprocating motion in the pump cylinder, and wherein a packing is adapted to be carried by the packing holder and to be received in engagement with the inner wall of the cylinder, the packing including three or more fabric reinforced uniform discs of elastomeric material bonded together in a mold under heat and pressure to form a rigid and generally hemispherical cup having a layered construction and having a smooth convex rear surface and a concave front surface with a cup lip extending between the rear and front surfaces at the open end of the cup, wherein the improvement comprises an improved packing construction comprised of a fabric reinforced disc of elastomeric material having a high degree of hardness defining a major portion of the convex rear surface of the packing, the perimeter of said disc terminating on the smooth convex rear surface of the packing cup outside the annular area defined by contact between the rear surface of the cup and the inner wall of the cylinder during both the compression and return strokes of the pump, and successive ones of the plurality of discs in a layered sequence terminating on the smooth convex rear surface of the packing within the annular area defined by contact between the rear surface of the cup and the inner wall of the cylinder and being made of elastomeric material of succesively lesser hardness and with the perimeter of said successive discs terminating at positions progressively closer to said cup lip as the hardness decreases, whereby extrusion of the packing between the packing holder and the cylinder wall is resisted by the external higher hardness material.

2. A combination as in claim 1 including a fabric reinforced disc defining the concave front surface of the packing, said front disc having a relatively high hardness elastomeric material therein as compared to the discs in the center of said packing, said disc defining the front surface having a perimeter terminating on the cup lip.

3. A cup shaped packing adapted to be carried by a packing holder in the cylinder of a reciprocating pump, said packing having three or more uniform discs of an elastomeric material bonded under heat and pressure and formed into a rigid and generally hemispherical cup having a smooth convex side, said bonded discs comprising at least one high hardness disc forming the outermost layer on the smooth convex side of the packing for resisting extrusion of the packing between the packing holder and the cylinder wall, said outermost layer terminating on the smooth convex side of the cup surface outside the annular area defined by contact between the cup and the cylinder wall during both the compression and return strokes of the pump, and a succession of lesser hardness discs proceeding from said outermost layer which terminate on the smooth convex side of the packing within the annular area defined by contact between the cup lip and the cylinder wall, the perimeter of said successive discs terminating at positions progressively closer to said cup lip as the hardness decreases, whereby a more uniform distribution of contact pressure is obtained across the contact area between the packing and the cylinder wall due to the resistance to extrusion provided by the high hardness disc.

4. A cup shaped packing as in claim 3 together with an additional high hardness disc forming the inner layer on the concave side of the cup shaped packing, said additional disc having a perimeter terminating on a lip disposed between the convex and concave surfaces of the cup.

5. A cup shaped packing as in claim 3 wherein said high hardness disc measures substantially in the order of 100 of the Shore A scale and the disc which terminates at the leading edge of said cup lip measures substantially in the order of 60 on the Shore A scale.

6. A cup shaped packing as in claim 4 wherein said high hardness discs measure substantially 100 on the Shore A scale.

* * * * *